Jan. 3, 1967 A. G. STIMSON 3,295,429
ELECTROMAGNETIC RELAY EXPOSURE CONTROLS
Filed May 12, 1964 2 Sheets-Sheet 1

ALLEN G. STIMSON
INVENTOR.

BY *R. Frank Smith*
*Robert W. Hampton*

ATTORNEYS

ALLEN G. STIMSON
INVENTOR.

ATTORNEYS

United States Patent Office 3,295,429
Patented Jan. 3, 1967

3,295,429
ELECTROMAGNETIC RELAY EXPOSURE
CONTROLS
Allen G. Stimson, Rochester, N.Y., assignor to Eastman Kodak Company, Rochester, N.Y., a corporation of New Jersey
Filed May 12, 1964, Ser. No. 366,739
11 Claims. (Cl. 95—64)

The present invention relates to electromagnetic exposure control systems for cameras and more particularly to an electromagnetic exposure control system that is biased by permanent magnet means.

An object of the invention is to control exposure of film in a camera by a simple device that is economical to manufacture, accurate and reliable.

Another object of the invention is to operate an electromagnetic exposure control system within the range of its greatest magnetic sensitivity.

Another object of the invention is to use a minimum of power to achieve a maximum of reliability and accuracy in positioning an exposure control member as a function of the illumination of a photoresponsive device.

Another object of the invention is to improve the efficiency of electromagnetic exposure control systems.

These and other objects of the inventioin are accomplished by using permanent magnet means to induce a magnetic bias in the armature of an electromagnetic exposure control system so that variations in the energization of the coil of the electromagnet effect response of the armature within the range of its greatest permeability and hence position it with greatest effectiveness, accuracy, and sensitivity.

The invention will be better understood from the following description, reference being made to the accompanying drawings, wherein.

It is known that the permeability of magnetic substances such as ferromagnetic materials, particularly "soft iron" siutable for electromagnetic controls, varies with flux density in the material. For many such ferromagnetic materials permeability is quite low when flux density is low, but rises when flux density increases. Thus, the first few ampere turns of magnetomotive force produces relatively few lines of flux in such substances compared to the change in flux produced by the same number of ampere turns added to or subtracted from a higher value of magnetomotive force.

Figure 1:
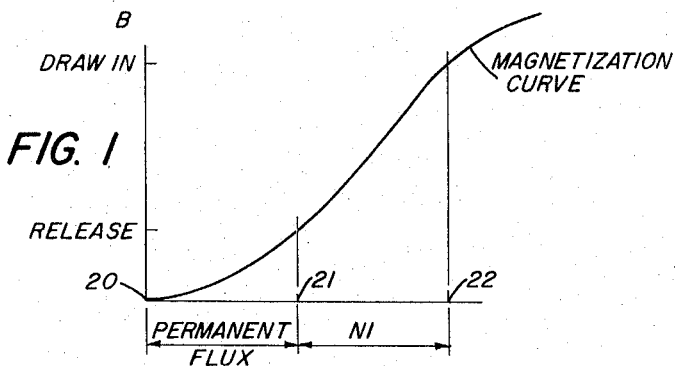
FIG. 1 shows a graph of a magnetization curve illustrating operation of the movable armature in an exposure control system constructed according to the invention.

The graph of FIG. 1 illustrates some of these facts in relation to a magnetization curve. The abscissa is magnetomotive force expressed as ampere turns, or "NI" and the ordinate is flux density indicated as "B." A curve of this type represents the magnetization characteristics for the material of the movable armature of an electromagnet that is drawn in and released at the indicated points on the ordinate. It can be seen from the curve of FIG. 1 that the first few ampere turns of the magnetomotive force produce relatively few lines of magnetic flux, indicating that at low flux densities permeability is relatively low. In the mid section of the curve, increases in ampere turns produce greater increases in flux density, indicating higher permeability. At the top of the magnetization curve where, the material approaches magnetic saturation and permeability is relatively low, further increases in ampere turns producing relatively small increases in flux density.

These facts may be advantageously applied to photographic exposure control devices where comparatively small power sources are available and maximum efficiency is desired. According to the invention, permanent magnet means can be associated with an electromagnet in an exposure control device for inducing a biasing magnetism in a movable armature to insure that the armature will operate in the range of its greatest permeability, i.e., in the steepest portion of its magnetization curve. Thus as shown in FIG. 1, permanent magnetic flux can be used for biasing the armature with a predetermined induced magnetism so that changes in ampere turns in the electromagnet's coil in response to illumination of a photocell in circuit with the coil affect armature magnetization between points 21 and 22 on the abscissa. This range includes the greatest permeability of the armature, so that the coil of the electromagnet effects induced magnetism in the armature throughout the range of the armature's greatest magnetic sensitivity, which increases the accuracy and the precision of the armature's operation.

In one embodiment, as shown in FIG. 1, a permanent magnet can bias the armature by supplying ampere turns from point 20 to point 21 on the abscissa, and then energization of the electromagnet's coil supplies ampere turns from point 21 to point 22, the desired magnetically sensitive range. Such an ararngement can be used for an armature that is normally spaced from the core of the electromagnet and drawn in at a predetermined level of coil energization. Less work is done by the coil of the electromagnet if an armature is normally maintained in its drawn in position, i.e., abutting the electromagnet core, and released when total ampere turns are reduced to a predetermined value. For such an arrangement a permanent magnet may supply ampere turns from point 20 to point 22 on the abscissa, a total magnetomotive force sufficient for drawing or holding the armature in against spring tension tending to pull it away from the core. With such magnetic bias arrangement, the field of the coil opposes the field of the permanent magnet, reducing the induced magnetism of the armature according to illumination of the photocell. At a predetermined value of photocell illumination, the coil field reduces the magnetic attraction between the permanent magnet and the armature to the point where the latter is released from the core of the electromagnet under the tension of the spring.

FIGS. 2–7 show various embodiments of the above principles and are presented as illustrative only, many arrangements and structures other than those illustrated being possible.

Figure 2:
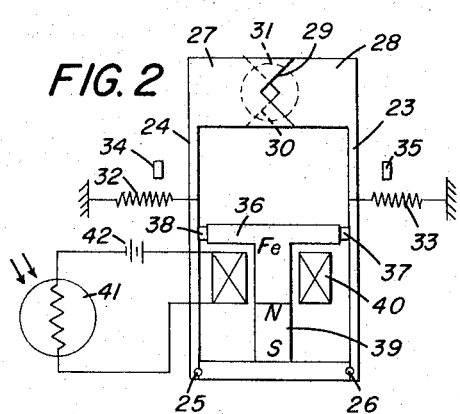
FIG. 2 shows a front view of a cat's-eye diaphragm device embodying the invention.

FIG. 2 shows a cat's-eye lens diaphragm formed of legs 24 and 23, pivoted at points 25 and 26 carrying vane members 27 and 28, respectively. Vanes 27 and 28 have respective V-shaped notches 29 and 30 which partially overlap to define the effective size of an exposure aperture on the axis of a taking lens 31 in a camera. A pair of springs 32 and 33 urge legs 24 and 23 outward toward respective stops 34 and 35.

As shown in FIG. 2, legs 23 and 24 are drawn in or closely spaced from a soft iron core 36 and are separated from the core by nonmagnetic spacers 37 and 38. A permanent magnet 39 is arranged next to core 36 for inducing a biasing magnetism in the core and in legs 23 and 24, whereby the latter normally are held close against the core, as illustrated. If it is undesirable to have magnet 39 powerful enough to draw legs 23 and 24 against core 36 from their released positions against stops 34 and 35, a typical, mechanical resetting device (not shown) can be used to return legs 23 and 24 to the position illustrated in FIG. 2 during each operating cycle.

A coil 40 of the electromagnet is associated with the core 36 and is connected with a light sensing circuit illustrated as photoresponsive device 41 and battery 42. Photoresponsive device 41 is shown as a photoconductive cell energized by battery 42, but other photoresponsive elements including photoemissive and photovoltaic devices can be used. Coil 40 is variably energized as a function of the illumination of photocell 41 and such energization of the coil produces a variable magnetic field opposing the field of permanent magnet 39 so as to reduce the flux in core 36 and legs 23 and 24. At a predetermined level of illumination of cell 41, the energization of coil 40 sufficiently reduces such induced magnetism so that magnetic attraction can no longer hold legs 23 and 24 against the force of springs 32 and 33, and the legs are moved against stops 34 and 35 for enlarging the effective size of the exposure aperture. By varying the thickness of spacers 37 and 38, or by varying the relative forces of springs 32 and 33, leg 23 can be released at one level of coil energization and leg 24 at another level, making a total of three aperture sizes.

It can be seen from the above that the bias of permanent magnet 39 allows the ampere turns produced in coil 40 to influence core 36 and legs 23 and 24 in the most sensitive portions of their magnetization curve, such as between points 21 and 22 as illustrated in FIG. 1. The same principles can be applied to a variety of structures embodying the invention, such as illustrated in FIGS. 3–7.

Figure 3:
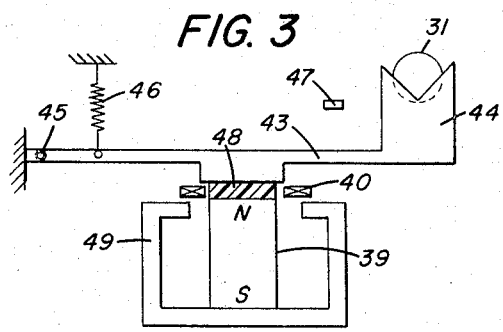
FIGS. 3–5 show front views of various embodiments of the invention employing single-vane diaphragms.
Figure 4:
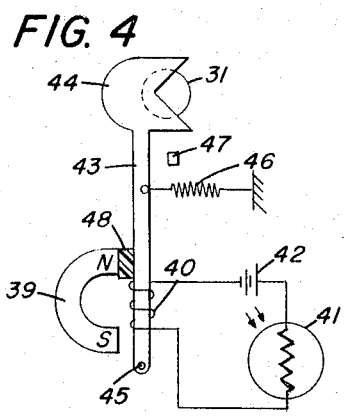
Figure 5:
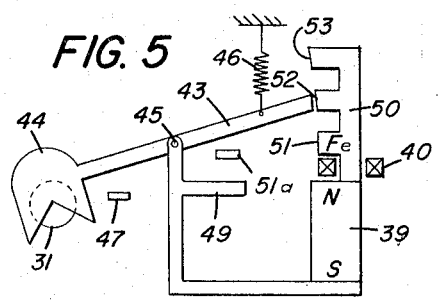

In FIGS. 3–5, various arrangements of single-vane lens diaphragms are illustrated. In each embodiment a vane 44 having a generally V-shaped aperture is fixed to a magnetic arm 43 pivoted at 45 and biased by a spring 46 toward a stop 47.

In FIG. 4, a biasing permanent magnet 39 is arranged for drawing arm 43 against a nonmagnetic spacer 48. Coil 40 opposes the field of the permanent magnet as described above in connection with FIG. 2, so that at a predetermined level of illumination of photocell 41, the holding force of permanent magnet 39 is sufficiently offset by energization of coil 40 so that arm 43 is moved by spring 46 against stop 47 to decrease the size of the exposure aperture.

The embodiment of FIG. 3 is similar to that of FIG. 4 except that coil 40, instead of merely opposing the magnetic flux of permanent magnet 39, diverts part of it into a flux return member 49. Thus, a portion of the flux lines of permanent magnet 39, instead of traversing the nonmagnetic spaced 48 and inducing magnetism in arm 43, is shunted through member 49. When the light responsive energization of coil 40 has diverted a predetermined value of flux through member 49, arm 43 is released and moves against stop 47 under the force of spring 46 for reducing the size of the exposure aperture.

Referring to FIG. 5, an iron core 50 is formed to define a plurality of projections, such as 51–53, in which lines of magnetic flux can be concentrated. When coil 40 is unenergized, permanent magnet 39 provides sufficient magnetic flux for holding arm 43 against a stop 51a, where it is aligned with and adjacent to projection 51. As coil 40 is energized in response to photocell illumination, a portion of the magnetic flux is diverted through a return path 49, and spring 46 raises arm 43 to the position illustrated in FIG. 5 where it is aligned with and adjacent to projection 52. Movement to such position reduces the size of the exposure aperture and the force of spring 46 so that a reduced level of magnetic flux is sufficient to retain arm 43 at the illustrated position. As coil 40 is energized to a higher value and diverts a greater amount of magnetic flux from magnet 20 through the return path 49, spring 46 raises arm 43 to a position adjacent projection 53 for a further reduction of the size of the exposure aperture. Even higher energization of coil 40 results in spring 46 moving arm 43 above projection 53 and into engagement with stop 47 for reducing the effective size of the exposure aperture to a minimum. Clearly, as many such flux concentration points as are distinguishable and convenient may be arranged for an exposure control device according to the invention.

Figure 6:
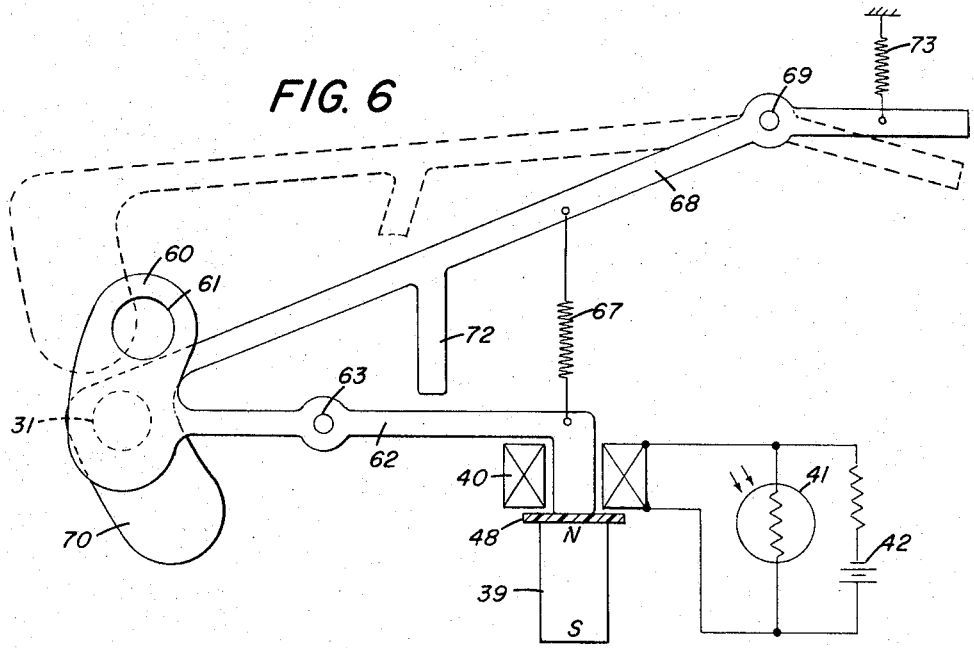
FIG. 6 shows a front view of a shutter timing device embodying the invention.

FIG. 6 shows a device for varying shutter time according to the invention. Fixed to an armature 62, which is pivotable at 63, is a shutter vane 60 provided with an opening 61 for passing over the taking lens 31. The speed of movement of the shutter vane aperture 61 over lens 31 determines the exposure duration. Armature 62 is formed of magnetic material in which magnetism is induced for attracting the armature toward the biasing permanent magnet 39 and into contact with the non-magnetic spacer 48. Coil 40 is veriably energized, as a function of ambient illumination, by a light sensing circuit including battery 42 and photocell 41. Coil 40 is connected in parallel wtih photocell 41 and therefore is energized as an inverse function of the illumination of the photocell. Suitable amplifying means of low burden may be substituted for such circuit for accomplishing the desired inverse energization.

An actuating mechanism 68, illustrated as a lever pivotally mounted at 69, is connected by a spring 67 to armature 62. Actuating lever 68 is movable by the camera against the tension of a spring 73, from its solid line position to its broken line position, as illustrated in FIG. 6. Such movement increases tension in spring 67 and moves an aperture obscuring vane 70 from alignment with lens 31, thereby permitting an exposure to occur upon movement of shutter vane 60. At some time during movement of actuator 68 beyond the position where vane 70 has moved out of alignment with lens 31, the tension of spring 67 overcomes the magnetic attraction between magnet 39 and armature 62. This release position is determined by the energization of coil 40, which opposes the magnetic flux of permanent magnet 39. Alternatively, coil 40 can be arranged to divert magnetic flux through a return path such as illustrated in the embodiments of FIGS. 3 and 5.

As can be seen from FIG. 6, the illumination of photocell 41 determines the force of spring 67 at the time armature 62 is released. In turn, the spring force at that time determines the speed of movement of the shutter vane, which determines the exposure duration.

After an exposure, actuator 68 is returned to its solid line position, as illustrated in FIG. 6, by spring 73. On the return movement of actuator 68, vane 70 covers lens 31 and a projection 72 on the actuator engages armature 62 for returning the latter into engagement with the nonmagnetic spacer 48 of magnet 39. The positioning of vane 70 over lens 31 before such returning or resetting motion of armature 62 prevents any exposure through lens 31 as opening 61 passes the lens.

Figure 7:
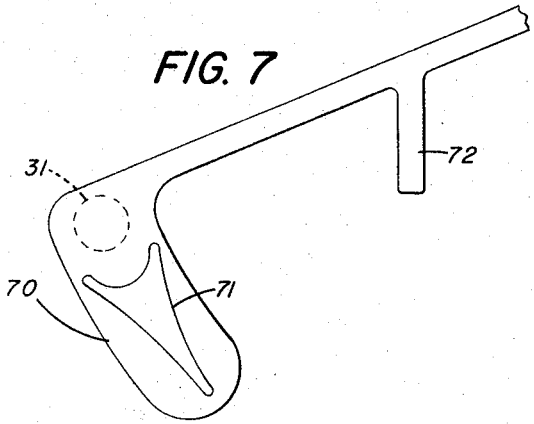
FIG. 7 shows a variation of an element of the device illustrated in FIG. 6.

The device of FIG. 6 may be modified by adjusting the tension characteristics of spring 67 and forming an opening 71 in vane 70 as shown in FIG. 7. With such an arrangement, armature 62 is released at some position of actuator 68 such that opening 71 is over lens 31. Thus, vane opening 71 functions as a diaphragm vane, adjusting the size of the exposure aperture. By such an arrangement, both shutter time and effective aperture size are regulated by the same simple device.

The invention has been described in detail with particular reference to preferred embodiments thereof, but it will be understood that variations and modifications can be effected within the spirit and scope of the invention as described hereinabove and as defined in the appended claims.

I claim:

1. In a device for regulating a photographic aperture as a function of the illumination of a photoresponsive element, said device including an electromagnetic having a coil in circuit with said element and variably energized as a function of said illumination and an armature formed of magnetic material and positionable relative to said coil as a function of the energization of said coil, the improvement comprising permanent magnet bias means fixed with respect to said coil for inducing a predetermined magnetism in said armature so that coil energization operates on the armature in its range of greatest permeability.

2. The device of claim 1, in combination with: a photographic diaphragm having an adjustable aperture size; and means coupling said armature to said diaphragm for controlling the effective size of said aperture as a function of the position of said armature.

3. The device of claim 1, in combination with: a variable-speed photographic shutter; and means coupling said armature to said shutter for controlling the speed of said photographic shutter as a function of the position of said armature.

4. A device for regulating the time of an exposure through a photographic aperture as a function of the illumination of a photoresponsive element, comprising:

an electromagnet having a coil variably energized as a function of said illumination and an armature formed of magnetic material and operatively movable relative to said coil and in response to varied energization of said coil from a first position proximate said coil to a second position spaced from said coil;

permanent magnet means arranged near said coil for biasing said armature toward said first position;

a shutter vane movable with said armature for uncovering and then covering said aperture as said armature moves from said first to said second position, the time of said exposure being controlled by the speed of movement of said shutter vane; and variable tensioning means for biasing said armature for movement from said first to said second position, the force required of said tensioning means to initiate said operative movement approximately equalling the difference between forces on said armature from said permanent magnet and coil, and the force applied to said armature by said tensioning means.

5. The device of claim 4, wherein said tensioning means includes a manually movable member aranged for returning said armature from said second position to said first position, with a vane for covering said aperture for said return movement.

6. The device of claim 4, wherein said tensioning means includes a manually movable member, with a diaphragm vane for varying the effective size of said aperture as a function of the force applied to said armature by said tensioning means.

7. A device for regulating the effective size of a photographic aperture as a function of the illumination of a photoresponsive element, comprising:

a movable diaphragm vane formed of magnetic material and positionable in first and second positions to form apertures of different sizes in said two positions;

spring means for biasing said vane from said first position to said second position;

permanent magnet means for counterbiasing said vane from said second to said first position; and a coil fixed with respect to said permanent magnet means, and variably energized as a function of said illumination for magnetically opposing the bias of said permanent magnet, whereby said vane is released from said first position and moved to said second position at a predetermined level of illumination when the bias of the permanent magnet is counteracted.

8. The device of claim 7, with reset means for returning said vane from said second to said first position.

9. The device of claim 7, with a magnetic return path including said vane means, said coil magnetically opposing the bias of said permanent magnet by diverting magnetic flux between said permanent magnet and said vane means into said magnetic return path.

10. The device of claim 7, wherein said permanent magnet means induces magnetism in said vane means sufficient, when unopposed, for retaining the latter in said first position, and said coil is arranged for magnetically opposing the magnetism induced by said permanent magnet.

11. A device for regulating the effective size of a photographic aperture as a function of the illumination of a photoresponsive element, comprising:

an electromagnet having a coil variably energizable as a function of said illumination, and an armature formed of magnetic material and movable in response to varied energization of said coil from a first position proximate said coil to a second position spaced from said coil;

permanent magnet means arranged near said coil and fixed with respect thereto for inducing magnetism in said armature to bias said armature toward said first position;

a diaphragm vane movable with said armature for adjusting the effective size of said aperture in accordance with the position of said armature; and resilient means for biasing said armature for movement from said first position to said second position upon a predetermined energization of said coil which produces a magnetic field which counteracts the bias of the magnetic field of the permanent magnet.

References Cited by the Examiner

UNITED STATES PATENTS

| 2,999,445 | 9/1961 | Fahlenberg | 95—53 |
| 3,082,674 | 3/1963 | Bagby | 95—64 |

NORTON ANSHER, *Primary Examiner.*

CLIFFORD B. PRICE, *Examiner.*

UNITED STATES PATENT OFFICE
CERTIFICATE OF CORRECTION

Patent No. 3,295,429                                        January 3, 1967

Allen G. Stimson

It is hereby certified that error appears in the above numbered patent requiring correction and that the said Letters Patent should read as corrected below.

Column 4, line 72, for "electromagnetic" read -- electromagnet --.

Signed and sealed this 3rd day of October 1967.

(SEAL)
Attest:

ERNEST W. SWIDER                                EDWARD J. BRENNER
Attesting Officer                                      Commissioner of Patents